(12) United States Patent
Kimura et al.

(10) Patent No.: US 12,451,670 B2
(45) Date of Patent: Oct. 21, 2025

(54) LIGHT-EMITTING DEVICE

(71) Applicant: SONY SEMICONDUCTOR SOLUTIONS CORPORATION, Kanagawa (JP)

(72) Inventors: Hideki Kimura, Kanagawa (JP); Yoshiaki Watanabe, Kanagawa (JP); Yoshinori Yamauchi, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 763 days.

(21) Appl. No.: 17/755,775

(22) PCT Filed: Nov. 6, 2020

(86) PCT No.: PCT/JP2020/041560
§ 371 (c)(1),
(2) Date: May 6, 2022

(87) PCT Pub. No.: WO2021/095660
PCT Pub. Date: May 20, 2021

(65) Prior Publication Data
US 2022/0393435 A1 Dec. 8, 2022

(30) Foreign Application Priority Data
Nov. 15, 2019 (JP) .................. 2019-207371

(51) Int. Cl.
*H01S 5/183* (2006.01)
*H01S 5/22* (2006.01)
(Continued)

(52) U.S. Cl.
CPC ...... *H01S 5/18361* (2013.01); *H01S 5/18313* (2013.01); *H01S 5/2202* (2013.01);
(Continued)

(58) Field of Classification Search
CPC ............ H01S 5/18361; H01S 5/18313; H01S 5/2202; H01S 5/2226; H01S 5/305; H01S 5/323
See application file for complete search history.

(56) References Cited

U.S. PATENT DOCUMENTS

| 5,328,854 A * | 7/1994 | Vakhshoori | ......... H10H 20/013 438/525 |
|---|---|---|---|
| 2003/0063649 A1* | 4/2003 | Ezaki | .................... H01S 5/1833 372/96 |
| 2020/0412090 A1* | 12/2020 | Inoue | .................. H01S 5/18313 |

FOREIGN PATENT DOCUMENTS

| JP | 2003-309325 A | 10/2003 |
|---|---|---|
| JP | 2008-034637 A | 2/2008 |

(Continued)

OTHER PUBLICATIONS

International Search Report and Written Opinion of PCT Application No. PCT/JP2020/041560, issued on Jan. 12, 2021, 10 pages of ISRWO.

*Primary Examiner* — Yuanda Zhang
(74) *Attorney, Agent, or Firm* — CHIP LAW GROUP

(57) ABSTRACT

Provided is a light-emitting device that includes a light emission section, a separation groove, and a high reflectance region. The light emission section includes a stack structure including an active layer, a first reflector, and a second reflector. The active layer performs light emission by current injection. The first reflector and the second reflector are stacked in a first direction with the active layer interposed therebetween. The separation groove is provided symmetrically around the light emission section on an emission surface of light from the stack structure in the first direction. The separation groove is dug in the stack structure in the first direction. The high resistance region is provided in the stack structure on the outer side of an outermost shape of the (Continued)

separation groove on the emission surface. The high resistance region has electrical resistance higher than that of the light emission section.

15 Claims, 9 Drawing Sheets

(51) Int. Cl.
 *H01S 5/30* (2006.01)
 *H01S 5/323* (2006.01)
(52) U.S. Cl.
 CPC ............ *H01S 5/2226* (2013.01); *H01S 5/305* (2013.01); *H01S 5/323* (2013.01)

(56) References Cited

FOREIGN PATENT DOCUMENTS

| | | |
|---|---|---|
| JP | 2008-042053 A | 2/2008 |
| JP | 2010-114404 A | 5/2010 |
| JP | 2012-134473 A | 7/2012 |
| JP | 2013175712 A | 9/2013 |
| TW | 201246279 A | 11/2012 |

* cited by examiner

[FIG. 1]
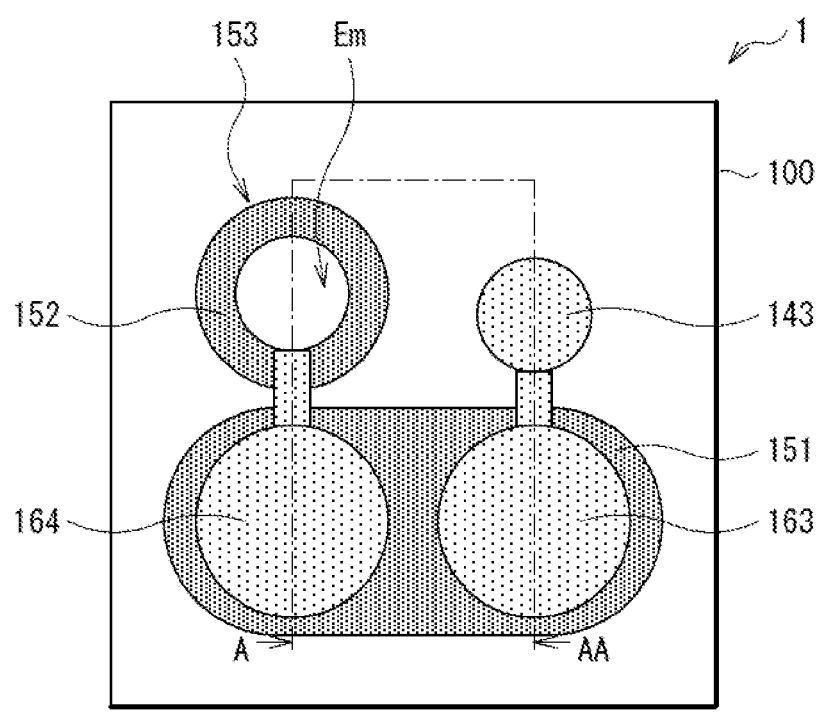

[FIG. 2]
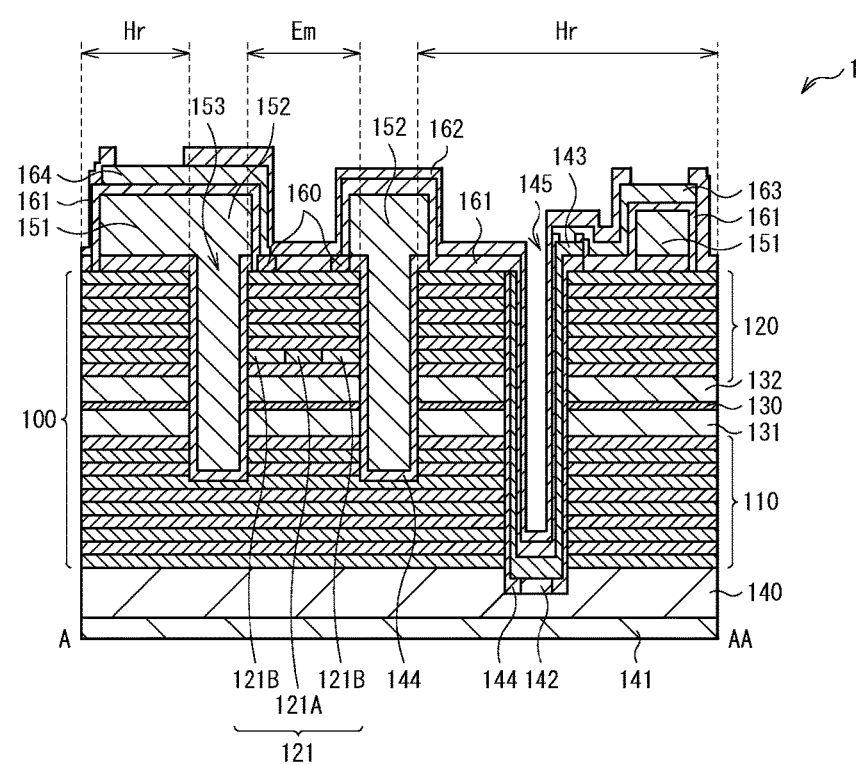

[FIG. 3]
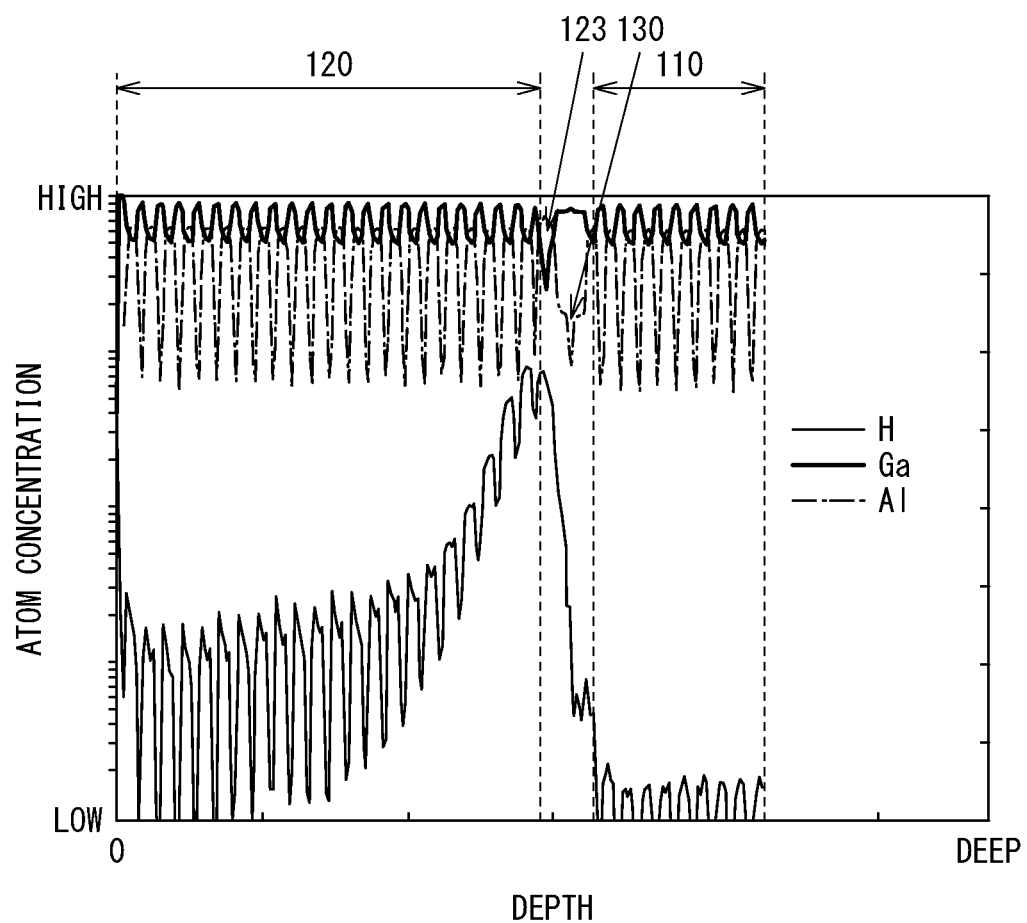

[FIG. 4]
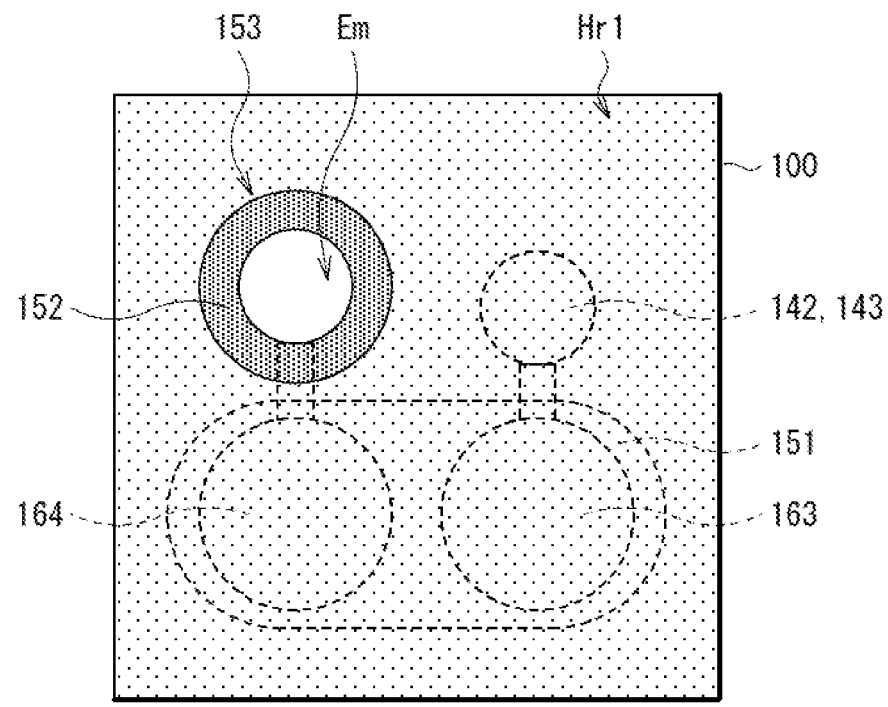
[FIG. 5]
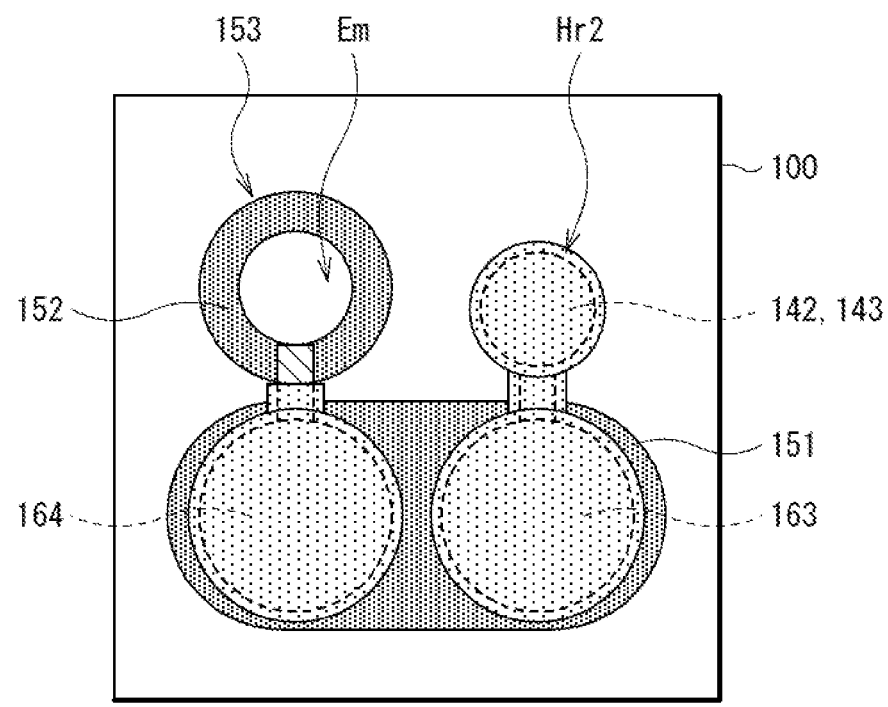

[FIG. 6]
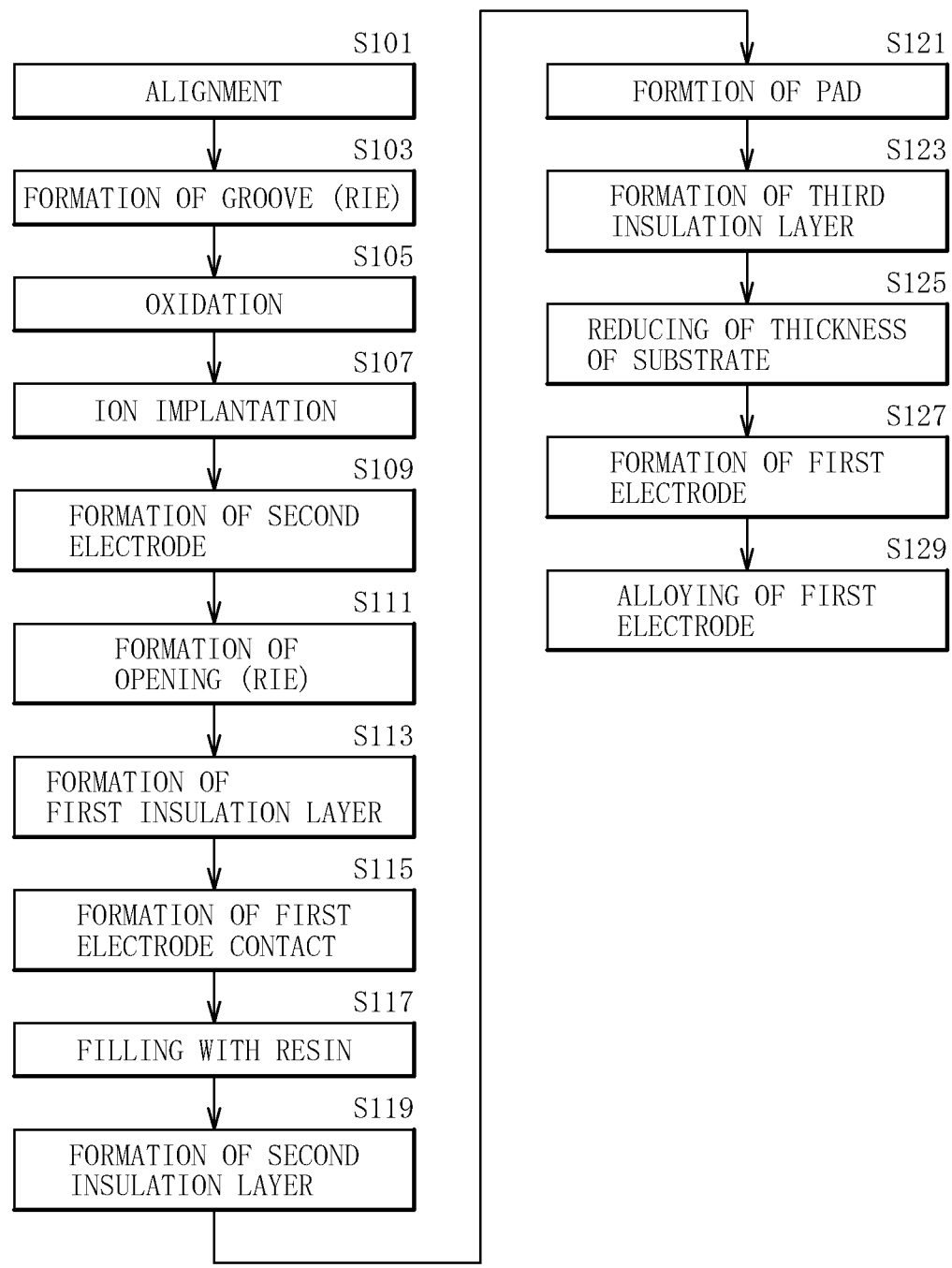

[FIG. 7]
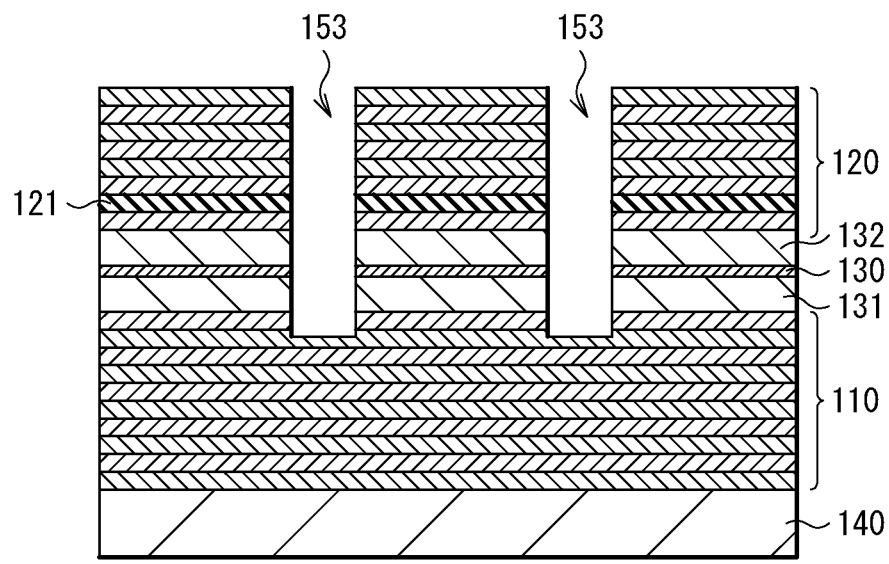
[FIG. 8]
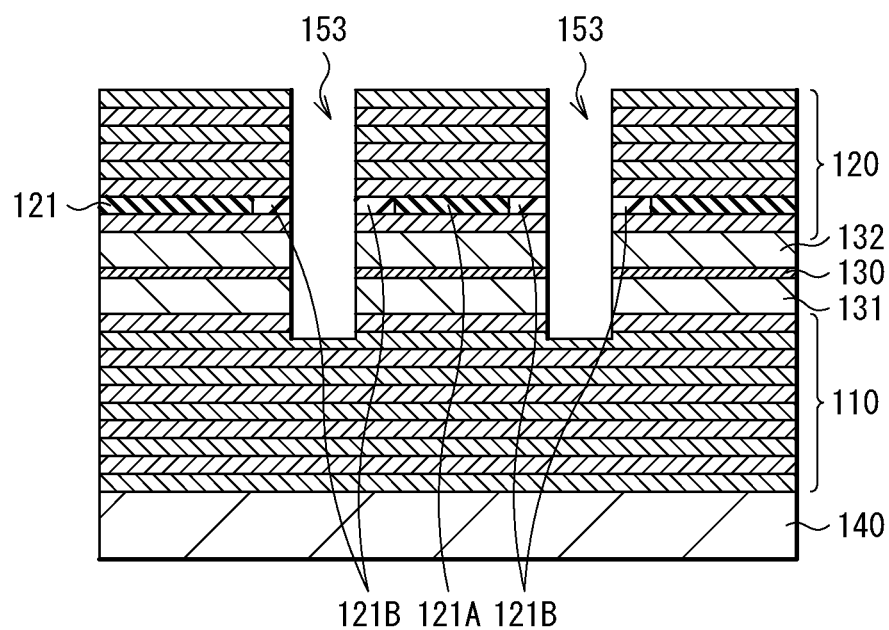

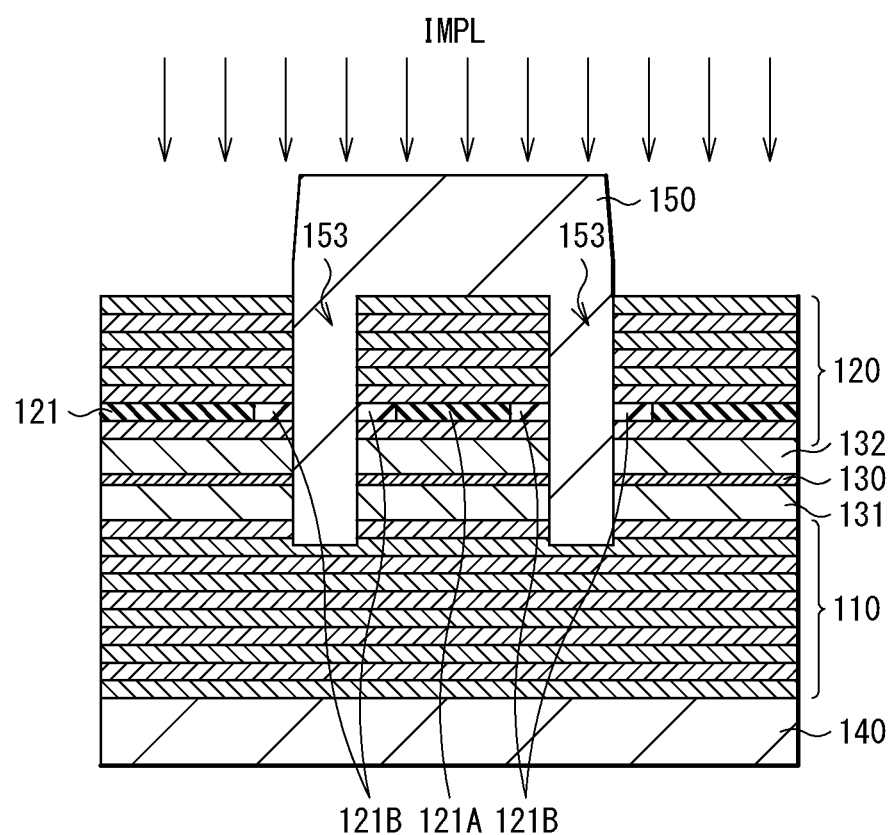
[FIG. 9]

[FIG. 10]
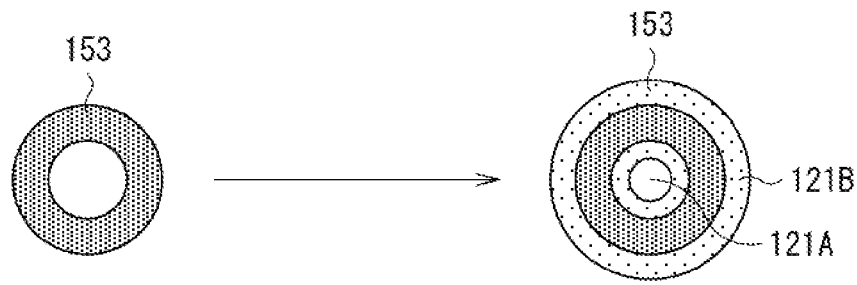
[FIG. 11A]
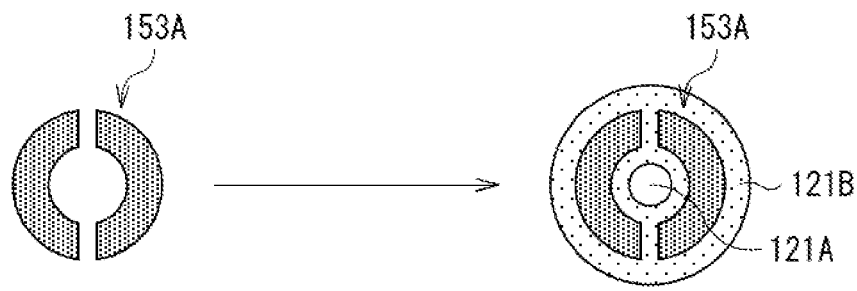
[FIG. 11B]
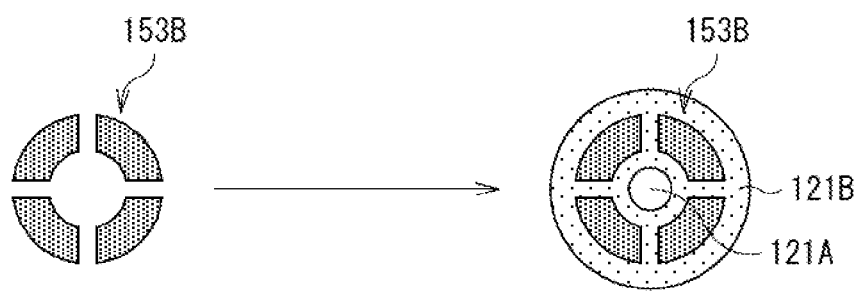
[FIG. 11C]
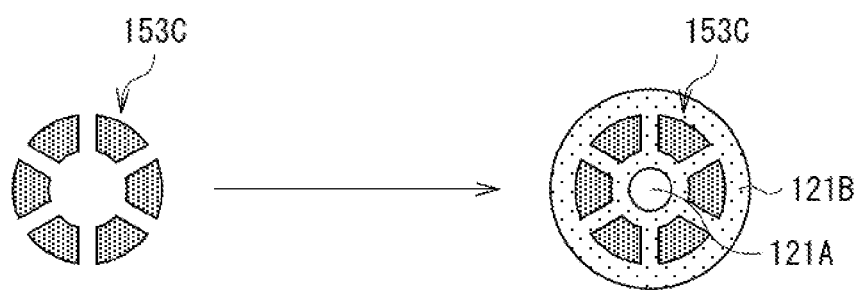

[FIG. 11D]
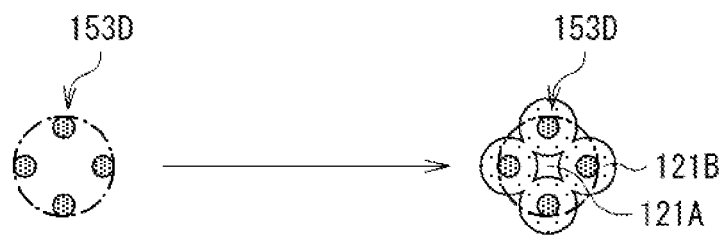
[FIG. 11E]
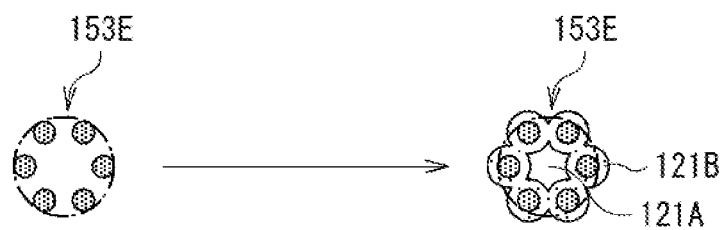
[FIG. 11F]
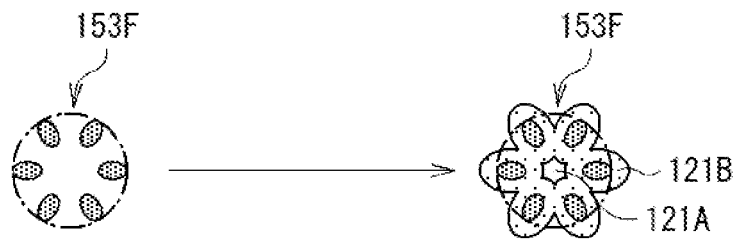

LIGHT-EMITTING DEVICE

CROSS REFERENCE TO RELATED APPLICATIONS

This application is a U.S. National Phase of International Patent Application No. PCT/JP2020/041560 filed on Nov. 6, 2020, which claims priority benefit of Japanese Patent Application No. JP 2019-207371 filed in the Japan Patent Office on Nov. 15, 2019. Each of the above-referenced applications is hereby incorporated herein by reference in its entirety.

TECHNICAL FIELD

The present disclosure relates to a light-emitting device.

BACKGROUND ART

Recently, with the explosive increase in the amount of data transmitted and received on the Internet, it has been increasing to adopt optical communication using an optical fiber for near field communication in data centers. As a light source for the optical communication using the optical fiber, for example, a vertical-cavity surface-emitting semiconductor laser (Vertical Cavity Surface Emitting Laser: VCSEL) is used (for example, PTL 1).

CITATION LIST

Patent Literature

PTL 1: Japanese Unexamined Patent Application Publication No. 2003-309325

SUMMARY OF THE INVENTION

Accordingly, in order to improve speed and quality of optical communication, it is desired to improve a modulation speed of a light-emitting device to be used as a light source.

It is therefore desirable to provide a light-emitting device having an improved high-frequency characteristic.

A light-emitting device according to one embodiment of the present disclosure includes a light emission section, a separation groove, and a high resistance region. The light emission section includes a stack structure including an active layer, a first reflector, and a second reflector. The active layer performs light emission by current injection. The first reflector and the second reflector are stacked in a first direction with the active layer interposed therebetween. The separation groove is provided symmetrically around the light emission section on an emission surface of light from the stack structure in the first direction. The separation groove is dug in the stack structure in the first direction. The high resistance region is provided in the stack structure on outer side of an outermost shape of the separation groove on the emission surface. The high resistance region has electrical resistance higher than that of the light emission section.

According to the light-emitting device of the embodiment of the present disclosure, the separation groove dug in the stack structure is provided symmetrically around the light emission section including the stack structure that includes the active layer performing light emission by current injection and the first reflector and the second reflector stacked in the first direction with the active layer interposed therebetween. In addition, the high resistance region having the electrical resistance higher than that of the light emission section is provided in the stack structure on the outer side of the outermost shape of the separation groove. Accordingly, the light-emitting device makes it possible to reduce parasitic capacitance generated at an electrode or each wiring line of the light-emitting device, for example.

BRIEF DESCRIPTION OF DRAWINGS

FIG. 1 is a top view of a configuration of a light-emitting device according to one embodiment of the present disclosure.

FIG. 2 is a vertical cross-sectional view of the configuration of the light-emitting device according to the embodiment.

FIG. 3 is a graph illustrating an example of an element concentration distribution in a stacking direction of a stack structure in a high resistance region.

FIG. 4 is a top view of the light-emitting device illustrating an example of a region to provide the high resistance region.

FIG. 5 is a top view of the light-emitting device illustrating an example of the region to provide the high resistance region.

FIG. 6 is a flowchart for describing a flow of a method of manufacturing the light-emitting device according to the embodiment.

FIG. 7 is a vertical cross-sectional view for describing a process of the method of manufacturing the light-emitting device according to the embodiment.

FIG. 8 is a vertical cross-sectional view for describing a process of the method of manufacturing the light-emitting device according to the embodiment.

FIG. 9 is a vertical cross-sectional view for describing a process of the method of manufacturing the light-emitting device according to the embodiment.

FIG. 10 is a plan view of plan shapes of a separation groove and a current confinement region.

FIG. 11A is a plan view of a variation of the plan shapes of the separation groove and the current confinement region.

FIG. 11B is a plan view of a variation of the plan shapes of the separation groove and the current confinement region.

FIG. 11C is a plan view of a variation of the plan shapes of the separation groove and the current confinement region.

FIG. 11D is a plan view of a variation of the plan shapes of the separation groove and the current confinement region.

FIG. 11E is a plan view of a variation of the plan shapes of the separation groove and the current confinement region.

FIG. 11F is a plan view of a variation of the plan shapes of the separation groove and the current confinement region.

MODES FOR CARRYING OUT THE INVENTION

Some embodiments of the present disclosure are described below in detail with reference to the drawings. The embodiments described below are specific examples of the present disclosure, and the technology according to the present disclosure is not limited to the following examples. In addition, arrangement, dimensions, dimensional ratios, and the like of each component of the present disclosure are not limited to the examples illustrated in each of the drawings.

Note that the description is given in the following order.
1. Configuration of Light-emitting Device
2. Working and Effects
3. Method of Manufacturing Light-emitting Device <1. Configuration of Light-Emitting Device>

First, referring to FIGS. 1 and 2, a configuration of a light-emitting device 1 according to an embodiment of the present disclosure is described. FIG. 1 is a top view of a configuration of the light-emitting device 1 according to the present embodiment. FIG. 2 is a vertical cross-sectional view of the configuration of the light-emitting device 1 according to the present embodiment. FIG. 2 schematically illustrates a cross-sectional view taken along a line A-AA in FIG. 1.

As illustrated in FIGS. 1 and 2, the light-emitting device 1 according to the present embodiment is a surface-emitting-type semiconductor laser.

The light-emitting device 1 includes a stack structure 100 on a first surface side (i.e., a front surface side) of a substrate 140. The stack structure 100 is provided by stacking a first reflector 110, a first spacer layer 131, an active layer 130, a second spacer layer 132, a current confinement layer 121, and a second reflector 120 in order from the substrate 140 side.

In addition, the stack structure 100 has a separation groove 153 dug annularly in a stacking direction in a portion of the first reflector 110, the first spacer layer 131, the active layer 130, the second spacer layer 132, the current confinement layer 121, and the second reflector 120. A separation layer 152 is provided inside the separation groove 153 with a first insulation layer 144 interposed therebetween. The stack structure 100 in a region on the inner side of the separation groove 153 and the separation layer 152 serves as a light emission section Em that emits laser.

The substrate 140 is, for example, an n-type GaAs substrate. In more detail, the substrate 140 may be a GaAs (100) substrate, or may be a GaAs (n11) substrate (n is an integer).

The first reflector 110 is a multilayer-film reflection mirror in which two or more sets of a low refractive index layer and a high refractive index layer are alternately stacked. For example, the first reflector 110 may be a multilayer-film reflection mirror in which low refractive index layers each including n-type $Al_{x1}Ga_{1-x1}As$ ($0<x1<1$) having a thickness of $\lambda_0/n_1$ ($\lambda_0$ is an oscillation wavelength of the active layer 130, and $n_1$ is a refractive index of the low refractive index layer) and high refractive index layers each including n-type $Al_{x2}Ga_{1-x2}As$ ($0<x2<1$) having a thickness of $\lambda_0/n_2$ ($\lambda_0$ is the oscillation wavelength of the active layer 130, and $n_2$ is a refractive index of the high refractive index layer) are alternately stacked.

The first spacer layer 131 includes, for example, n-type $Al_{x3}Ga_{1-x3}As$ ($0<x3<1$). The second spacer layer 132 includes, for example, p-type $Al_{x5}Ga_{1-x5}As$ ($0<x5<1$). A p-type impurity included in the second spacer layer 132 may be, for example, carbon (C), beryllium (Be), magnesium (Mg), zinc (Zn), or the like. The active layer 130 includes, for example, undoped $Al_{x4}Ga_{1-x4}As$ ($0<x4<1$), and performs light emission by current injection. Specifically, in the active layer 130, a region opposing a current injection region 121A of the current confinement layer 121 which will be described later emits light by the current injection.

The second reflector 120 is a multilayer-film reflection mirror in which two or more sets of a low refractive index layer and a high refractive index layer are alternately stacked. For example, the second reflector 120 may be a multilayer-film reflection mirror in which low refractive index layers each including p-type $Al_{x6}Ga_{1-x6}As$ ($0<x6<1$) having a thickness of $\lambda_0/n_3$ ($\lambda_0$ is the oscillation wavelength of the active layer 130, and $n_3$ is a refractive index of the low refractive index layer) and high refractive index layers each including p-type $Al_{x7}Ga_{1-x7}As$ ($0<x7<1$) having a thickness of $\lambda_0/n_4$ ($\lambda_0$ is the oscillation wavelength of the active layer 130, and $n_4$ is a refractive index of the high refractive index layer) are alternately stacked. A p-type impurity included in the low refractive index layers and the high refractive index layers forming the second reflector 120 may be, for example, carbon (C), beryllium (Be), magnesium (Mg), zinc (Zn), or the like.

The current confinement layer 121 is provided inside the second reflector 120 instead of the low refractive index layer which is provided about several layers away from the active layer 130 side of the second reflector 120. The current confinement layer 121 includes the current injection region 121A and a current confinement region 121B in an in-plane direction perpendicular to the stacking direction. The current injection region 121A is a region including p-type $Al_{x8}Ga_{1-x8}As$ ($0<x8<1$). The current confinement region 121B is a region including aluminum oxide ($Al_2O_3$) and provided in an outer edge region of the current injection region 121A. With this configuration, the current confinement layer 121 is able to confine a current-flowing region to the current injection region 121A.

Note that it is possible to form the current confinement region 121B by oxidizing high-concentration aluminum (Al) included in the current confinement layer 121 from a side surface of the separation groove 153 when the separation groove 153 is formed. For example, the current confinement region 121B may be provided as an oxidized region obtained by oxidizing the current confinement layer 121 including AlAs (aluminum arsenide) from the side surface of the separation groove 153. Further, the current injection region 121A may be provided as an unoxidized region of the current confinement layer 121 including AlAs (aluminum arsenide).

The separation groove 153 is a groove that has an annular plan shape and is dug in the stack structure 100 in the stacking direction at least to a region deeper than the active layer 130. The separation groove 153 is provided in order to electrically or optically separate the light emission section Em from other regions. For example, the separation groove 153 may be provided by digging the stack structure 100 through the second reflector 120, the current confinement layer 121, the second spacer layer 132, the active layer 130, and the first spacer layer 131 until reaching a portion of the first reflector 110.

The first insulation layer 144 is provided to cover the inner side of the separation groove 153 with an insulating material. Specifically, the first insulation layer 144 may be provided to cover a bottom surface and a side surface on the inner side of the separation layer 152 with silicon nitride (SiN) or the like.

The separation layer 152 is provided to fill the inside of the separation groove 153 with an organic resin, with the first insulation layer 144 interposed therebetween. For example, the separation layer 152 may be provided by filling the inside of the separation groove 153 with benzocyclobutene (BCB) which is a kind of low dielectric constant resin.

A second electrode 160 having an annular shape is provided on a surface on the second reflector 120 side of the stack structure 100 of the light emission section Em. The second electrode 160 is electrically coupled to a second electrode pad 164. The second electrode pad 164 is provided on the stack structure 100 on the outer side of the light emission section Em with the first insulation layer 144, a pad base 151, and a second insulation layer 161 interposed therebetween.

The second electrode 160 is provided on a surface of the stack structure 100 on the second reflector 120 side and has an annular shape with an opening in a region opposing the current injection region 121A. However, the second electrode 160 may have a shape other than the annular shape as long as the shape does not cover the region opposing the current injection region 121A. For example, the second electrode 160 may be provided by stacking an alloy of gold (Au) and germanium (Ge) and an alloy of gold (Au) and nickel (Ni) in order from the second reflector 120 side.

A first electrode 141 is provided on a second surface (i.e., a rear surface) of the substrate 140 on the opposite side to a first surface on which the stack structure 100 is provided. The first electrode 141 is electrically coupled to a first electrode pad 163 by means of first electrode contacts 142 and 143 provided inside an opening 145 running through the stack structure 100. The first electrode pad 163 is provided on the stack structure 100 on the outer side of the light emission section Em with the first insulation layer 144, the pad base 151, and the second insulation layer 161 interposed therebetween.

The first electrode 141 is provided over the entire second surface of the substrate 140. For example, the first electrode 141 may be provided by stacking an alloy of gold (Au) and germanium (Ge) and an alloy of gold (Au) and nickel (Ni) in order from the substrate 140 side.

The first electrode contacts 142 and 143 are provided on the inner side of the opening 145 dug through the stack structure 100 until reaching the substrate 140, and electrically couple the first electrode 141 and the first electrode pad 163 to each other. Specifically, the first electrode contact 142 is provided on a bottom surface of the opening 145. The first electrode contact 143 is provided on the bottom surface and a side surface of the opening 145 with the first electrode contact 142 and the first insulation layer 144 interposed therebetween. The first electrode contacts 142 and 143 may be provided by stacking an alloy of gold (Au) and germanium (Ge) and an alloy of gold (Au) and nickel (Ni) in order from the first electrode 141 side.

The pad base 151 is provided in a region on the outer side of the light emission section Em as an insulation layer continuous with the separation layer 152. Specifically, the pad base 151 is provided by stacking an organic resin forming the separation layer 152 on the surface of the stack structure 100 in the region on the outer side of the light emission section Em with the first insulation layer 144 interposed therebetween. As with the separation layer 152, in a case where the pad base 151 is provided with use of a low dielectric constant resin such as benzocyclobutene, the light-emitting device 1 is able to reduce capacitance between each of the second electrode pad 164 and the first electrode pad 163, and the stack structure 100.

The second insulation layer 161 is provided with use of an insulating material on surfaces of the pad base 151, the separation layer 152, and the stack structure 100. Specifically, the second insulation layer 161 may be provided with a uniform thickness in accordance with a surface shape of the light-emitting device 1 except for an electrical contact between the second electrode 160 and the second electrode pad 164 and an electrical contact between the first electrode contact 143 and the first electrode pad 163. For example, the second insulation layer 161 may be provided with use of an insulating silicon compound such as silicon nitride (SiN).

The second electrode pad 164 is provided on the pad base 151 adjacent to the light emission section Em with the second insulation layer 161 interposed therebetween. The second electrode pad 164 is electrically coupled to the second electrode 160, and serves as a coupling terminal between the second electrode 160 and outside. For example, the second electrode pad 164 can be provided by stacking titanium (Ti), platinum (Pt), and gold (Au) in order from the pad base 151 side.

The first electrode pad 163 is provided on the pad base 151 in a region different from that of the pad base 151 on which the second electrode pad 164 is provided, with the second insulation layer 161 interposed therebetween. The first electrode pad 163 is electrically coupled to the first electrode contact 143, and serves as a coupling terminal between the first electrode 141 and the outside. For example, the first electrode pad 163 can be provided by stacking titanium (Ti), platinum (Pt), and gold (Au) in order from the pad base 151 side.

A third insulation layer 162 is provided with use of an insulating material on surfaces of the second electrode pad 164, the first electrode pad 163, and the second insulation layer 161. Specifically, the third insulation layer 162 may be provided with a uniform thickness in accordance with the surface shape of the light-emitting device 1 except for a partial region on the second electrode pad 164 and a partial region on the first electrode pad 163. For example, the third insulation layer 162 may be provided with use of an insulating silicon compound such as silicon nitride (SiN).

Here, in the light-emitting device 1 according to the present embodiment, a region on the outer side of the light emission section Em and the separation layer 152 is provided as a high resistance region Hr. The high resistance region Hr is a region in which electrical resistance of the stack structure 100 is higher than electrical resistance of the stack structure 100 of the light emission section Em. The high resistance region Hr is provided by introducing an impurity element into the stack structure 100 from the second reflector 120 side to a region deeper than a depth at which the active layer 130 is provided.

The impurity that increases the electrical resistance of the stack structure 100 by being introduced into the stack structure 100 may include, for example, one or more of hydrogen (H), carbon (C), boron (B), oxygen (O), argon (Ar), aluminum (Al), gallium (Ga), and arsenic (As). For example, the high resistance region Hr may be formed by introducing one or more of C, B, O, Ar, Al, Ga, and As into the stack structure 100 at a concentration of $5 \times 10^{13}/cm^2$ or higher by an ion implantation method. Alternatively, the high resistance region Hr may be formed by introducing H into the stack structure 100 at a concentration of $5 \times 10^{14}/cm^2$ or higher by an ion implantation method. In a case where the impurity element introduced into the stack structure 100 is H, energy at the time when the impurity element is introduced into the stack structure 100 by an ion implantation method is reduced. Therefore, it is possible to reduce the cost of the process of forming the high resistance region Hr.

Further, the stack structure 100 in the high resistance region Hr has a concentration distribution of the impurity element in the stacking direction. For example, in the stack structure 100 in the high resistance region Hr, it may have a concentration peak of the impurity element at a depth at which the active layer 130 or the current confinement layer 121 is provided. In a case where the impurity element is so introduced into the stack structure 100 that the concentration peak of the impurity element is present at the depth at which the active layer 130 or the current confinement layer 121 is provided, the impurity element is more reliably introduced into the stack structure 100 to a desired depth. Therefore, in the light-emitting device 1, the stack structure 100 is more reliably caused to have higher resistance, thereby allowing for formation of the high resistance region Hr.

FIG. 3 illustrates an example of the concentration distribution of the impurity element in the stack structure 100 in the high resistance region Hr. FIG. 3 is a graph illustrating an example of the element concentration distribution in the stacking direction of the stack structure 100 in the high resistance region Hr.

The graph illustrated in FIG. 3 illustrates an example of the element concentration distribution of H (hydrogen), Ga (gallium), and Al (aluminum) in the stacking direction in a case where H (hydrogen) is introduced as the impurity element into the stack structure 100. The graph illustrated in FIG. 3 illustrates an example of a result obtained by analyzing the elemental concentration in the stack structure 100 by secondary ion mass spectrometry (Secondary Ion Mass Spectrometry: SIMS).

In the graph illustrated in FIG. 3, a region with a markedly low Ga concentration corresponds to the current confinement layer 121 (more specifically, the current confinement region 121B), and a region with widely low Al concentration corresponds to the active layer 130. Accordingly, a region on the shallower side of the active layer 130 corresponds to the second reflector 120, and a region on the deeper side of the active layer 130 corresponds to the first reflector 110.

As illustrated in FIG. 3, the H element concentration in the stack structure 100 has a signal fluctuated by a matrix effect of the SIMS due to an Al concentration difference between layers of the multilayer-film reflection mirror forming the second reflector 120. However, it gradually increases from the second reflector 120 side in the depth direction, and has a peak around the depth at which the current confinement layer 121 or the active layer 130 is provided. In a case where H is introduced into the stack structure 100 with such a concentration distribution, a sufficient amount of H is introduced into the stack structure 100 on the second reflector 120 side. Therefore, the increase in resistance of the stack structure 100 is more reliably achieved.

By providing such a high resistance region Hr, it is possible to further reduce parasitic capacitance generated at the second electrode pad 164 and the first electrode pad 163 in the light-emitting device 1.

Further, with reference to FIGS. 4 and 5, an example of a region to provide the high resistance region Hr is described. FIGS. 4 and 5 are each a top view of the light-emitting device 1, illustrating an example of the region to provide the high resistance region Hr.

For example, as illustrated in FIG. 4, a high resistance region Hr1 may be provided in a region excluding the light emission section Em and the separation layer 152. By providing the high resistance region Hr1 in such a region, the light-emitting device 1 makes it possible to further reduce the parasitic capacitance generated at the wiring line or each of the electrodes.

Further, as illustrated in FIG. 5, a high resistance region Hr2 may be provided in a region in which the second electrode pad 164, the first electrode pad 163, the first electrode contacts 142 and 143, and a wiring line electrically coupling them are provided. Providing the high resistance region Hr2 only in such a region serving as a current path makes it possible, in the light-emitting device 1, to efficiently reduce the parasitic capacitance generated at the wiring line or each of the electrodes by introduction of a smaller amount of the impurity element.

<2. Working and Effects>

Subsequently, working and effects of the light-emitting device 1 according to the present embodiment are described.

In the light-emitting device 1 according to the present embodiment, a predetermined voltage is applied between the second electrode 160 and the first electrode 141 via the second electrode pad 164 and the first electrode pad 163. Accordingly, a current is injected into the active layer 130 via the current injection region 121A of the current confinement layer 121, resulting in light emission due to recombination of electrons and holes in the active layer 130. Light emitted from the active layer 130 is reflected by the first reflector 110 and the second reflector 120 to thereby cause laser oscillation at a predetermined wavelength, and is emitted as a laser beam from the light emission section Em. That is, the light-emitting device 1 according to the present embodiment serves as a surface-emitting-type semiconductor laser.

Here, the light-emitting device 1 according to the present embodiment is used, for example, as a light source for optical communication using an optical fiber. Therefore, in order to improve communication speed or communication quality of the optical communication, it is desired to improve a high-frequency characteristic such as a modulation speed of the light-emitting device 1.

In order to improve the modulation speed of the light-emitting device 1, for example, it is conceivable to reduce electrical limitation of the light-emitting device 1 by reducing a CR time constant determined by resistance R and capacitance C of the light-emitting device 1.

In the light-emitting device 1 according to the present embodiment, it is possible to reduce the parasitic capacitance generated at the second electrode pad 164, the first electrode pad 163, and the like by increasing the resistance at least of the stack structure 100 in a region in which the second electrode pad 164, the first electrode pad 163, and the first electrode contacts 142 and 143 are provided on the outer side of the separation groove 153. Accordingly, the light-emitting device 1 makes it possible to reduce the CR time constant, and therefore to improve the high-frequency characteristic such as the modulation speed.

Note that it is also possible to reduce the parasitic capacitance generated at the light emission section Em to thereby further reduce the capacitance C of the light-emitting device 1 by similarly increasing the resistance of the stack structure 100 at an outer edge of the light emission section Em on the inner side of the separation groove 153. However, in a case where the resistance of the stack structure 100 on the inner side of the separation groove 153 including the light emission section Em is increased, a current-flowing path is narrowed at the light emission section Em. This increases the resistance R of the light-emitting device 1. Accordingly, in such a case, the reduction in the capacitance C is cancelled by the increase in the resistance R in the light-emitting device 1, which rather increases the CR time constant.

In the light-emitting device 1 according to the present embodiment, the resistance of the stack structure 100 in the region on the outer side of the separation groove 153 surrounding the light emission section Em is increased. Accordingly, the light-emitting device 1 according to the present embodiment makes it possible to reduce the capacitance C while suppressing an increase in the resistance R of the light-emitting device 1.

<3. Method of Manufacturing Light-Emitting Device>

Next, a method of manufacturing the light-emitting device 1 according to the present embodiment is described, with reference to FIGS. 6 to 10. FIG. 6 is a flowchart for describing a flow of the method of manufacturing the light-emitting device 1 according to the present embodiment. FIGS. 7 to 9 are each a vertical cross-sectional view for describing a process of the method of manufacturing the light-emitting device 1 according to the present embodiment. FIG. 10 is a plan view of plan shapes of the separation groove 153 and the current confinement region 121B.

As illustrated in FIG. 6, first, prepared is the substrate 140 having the stack structure 100 in which the first reflector 110, the first spacer layer 131, the active layer 130, the second spacer layer 132, the current confinement layer 121, and the second reflector 120 are stacked, and alignment for providing the separation groove 153 in the stack structure 100 is performed (S101). The substrate 140 includes, for example, a GaAs substrate.

Note that the stack structure 100 can be formed by sequentially depositing III-V compound semiconductors by an MOVCD (Metal Organic Chemical Vapor Deposition) method. As a raw material of the III-V compound semiconductor, for example, trimethylaluminum (TMA), trimethylgallium (TMG), trimethylindium (TMIn), arsine ($AsH_3$), or the like is used. As a raw material of the n-type impurity, for example, hydrogen selenide ($H_2Se$) or disilane ($Si_2H_6$) is used. As a raw material of the p-type impurity, for example, dimethylzinc (DMZ) or carbon tetrabromide ($CBr_4$) is used.

Thereafter, RIE (Reactive Ion Etching) is performed in accordance with the alignment to thereby form the separation groove 153 as illustrated in FIG. 7 (S103). Specifically, the second reflector 120, the current confinement layer 121, the second spacer layer 132, the active layer 130, the first spacer layer 131, and an upper portion of the first reflector 110 are selectively removed by RIE using a patterned resist as a mask. As a result, the separation groove 153 is formed. For example, as illustrated in FIG. 10, the plan shape of the separation groove 153 may be an annular shape.

Thereafter, as illustrated in FIG. 8, the current confinement layer 121 is oxidized from the side surface of the separation groove 153, to thereby form the current confinement region 121B and the current injection region 121A (S105). Specifically, an oxidation process is performed at a high temperature in a water vapor atmosphere, to thereby selectively oxidize Al included in the current confinement layer 121 from the side surface of the separation groove 153. As a result, as illustrated in FIG. 10, the current confinement region 121B including aluminum oxide ($Al_2O_3$) is formed around each of the inner side and the outer side of the separation groove 153, and the current injection region 121A is formed in an unoxidized region on the inner side surrounded by the current confinement region 121B.

Thereafter, as illustrated in FIG. 9, the impurity element such as hydrogen (H) is ion-implanted into the stack structure 100 with use of a resist 150 patterned to cover the separation groove 153 and the light emission section Em on the inner side of the separation groove 153 as a mask (S107). Thus, the resistance of the stack structure 100 in the region on the outer side of the separation groove 153 is increased. As a result, the high resistance region Hr is formed.

Thereafter, after the resist 150 is removed, the second electrode 160 having an annular shape with the opening in a region opposing the current injection region 121A is formed in the light emission section Em inside the separation groove 153 (109). Thereafter, the opening 145 running through the stack structure 100 is formed in a partial region of the surface of the stack structure 100 by RIE (S111). Thereafter, a film of SiN or the like is formed along the shapes of the surface of the stack structure 100, the inner side of the separation groove 153, and the inner side of the opening 145 to thereby form the first insulation layer 144 (S113).

Thereafter, an opening portion is provided in the first insulation layer 144 on the inner side of the opening 145, and the first electrode contact 142 is formed in the opening portion. In addition, the first electrode contact 143 is formed on the inner side of the opening 145 (S115). Thereafter, the separation groove 153 is filled with a low dielectric constant resin such as benzocyclobutene (BCB) to thereby form the separation layer 152 (S117). At this time, the low dielectric constant resin such as benzocyclobutene is also deposited in a region on the outer side of the separation groove 153, to thereby form the pad base 151.

Thereafter, a film of SiN or the like is formed in accordance with the surface shapes of the stack structure 100, the separation layer 152, and the pad base 151, to thereby form the second insulation layer 161 (S119). Thereafter, the second electrode pad 164 and the first electrode pad 163 are formed on the pad base 151 (S121). The second electrode pad 164 is electrically coupled to the second electrode 160 via the opening portion provided in the second insulation layer 161. The first electrode pad 163 is electrically coupled to the first electrode contact 143 via the opening portion provided in the second insulation layer 161.

In addition, a film of SiN or the like is formed to cover the first electrode pad 163, the second electrode pad 164, and the second insulation layer 161, to thereby form the third insulation layer 162. Note that an opening is provided in the third insulation layer 162 in a region corresponding to each of the first electrode pad 163 and the second electrode pad 164.

Further, the second surface of the substrate 140 on the opposite side to the first surface on which the stack structure 100 is provided is appropriately polished, to thereby make the substrate 140 thinner (S125). Thereafter, the first electrode 141 is formed on the second surface of the substrate 140 (S127), and the first electrode 141 is alloyed (S129). By the above processes, the light-emitting device 1 according to the present embodiment is manufactured.

Note that although the annular shape is described as an example of the plan shape of the separation groove 153 in the above description, the plan shape of the separation groove 153 in the light-emitting device 1 according to the present embodiment is not limited to the example described above. In the following, variations of the plan shape of the separation groove 153 are described with reference to FIGS. 11A, 11B, 11C, 11D, 11E, and 11F. FIGS. 11A, 11B, 11C, 11D, 11E, and 11F are each a plan view of a variation of the plan shapes of the separation groove 153 and the current confinement region 121B.

As illustrated in FIG. 11A, a separation groove 153A may have a shape obtained by dividing the annular shape into two with one straight line passing through the center of the annular shape. Because the current confinement region 121B is formed to expand around a region in which the separation groove 153A is provided, it is possible to form the current confinement region 121B to continuously surround the current injection region 121A even though the separation groove 153A is not provided continuously. This allows the separation groove 153A to electrically or optically separate the light emission section Em provided on the inner side from the region on the outer side. In such a case, the high resistance region Hr is provided, for example, in a region on the outer side of the divided annular shape.

Further, similarly, as illustrated in FIGS. 11B and 11C, separation grooves 153B and 153C may have shapes obtained by dividing the annular shape into four and six with a plurality of straight lines passing through the center of the annular shape, respectively. Because the current confinement region 121B is formed to expand beyond the divided portions of each of the separation grooves 153B and 153C, it is possible to form the current confinement region 121B to continuously surround the current injection region 121A, also with the separation groove 153B or 153C. This allows each of the separation grooves 153B and 153C to electrically or optically separate the light emission section Em provided on the inner side from the region on the outer side. In such a case, the high resistance region Hr is provided, for example, in a region on the outer side of the divided annular shape.

Further, as illustrated in FIGS. 11D, 11E, and 11F, separation grooves 153D, 153E, and 153F may each include a plurality of symmetrically provided grooves. Specifically, the separation grooves 153D, 153E, and 153F may each include a plurality of circular or elliptical grooves arranged symmetrically along the circumference. Because the current confinement region 121B is formed to expand isotropically from each groove of the separation grooves 153D, 153E, and 153F, it is possible to form the current confinement region 121B to mutually couple the grooves provided at predetermined intervals and to continuously surround the current injection region 121A. In such a case, the high resistance region Hr is provided in a region on the outer side of a circle circumscribed about each of the separation grooves 153D, 153E, and 153F.

That is, as illustrated in FIGS. 11A, 11B, 11C, 11D, 11E, and 11F, the separation groove 153 can be formed in various plan shapes as long as the current confinement region 121B is allowed to be provided continuously around the current injection region 121A. At this time, the high resistance region Hr is able to achieve the above-described effect by being provided on the outer side of the circle circumscribed about the plane shape of the separation groove 153.

The technology related to the present disclosure has been described above. However, the technology related to the present disclosure is not limited to the above-described embodiments and the like, and is modifiable in a variety of ways.

Furthermore, not all of the configurations and the operation described in the respective embodiments are essential to the configurations and the operation of the present disclosure. For example, among the components in each embodiment, components not described in the independent claims describing the most superordinate concept of the present disclosure should be understood as optional components.

The terms used throughout the specification and the appended claims should be construed as "non-limiting" terms. For example, the terms "include" or "be included" should be construed as "not limited to the example described with the term included". The term "have" should be construed as "not limited to the example described with the term have".

The terms used herein include some terms that are used merely for convenience of description and are not used to limit the configuration and the operation. For example, the term such as "right," "left," "upper," or "lower" merely indicates a direction in the referred drawing. Further, the terms "inner" and "outer" merely indicate a direction toward the center of the component of interest and a direction away from the center of the component of interest, respectively. This similarly applies to terms similar to the above-described terms and terms having similar meanings.

Note that the technology related to the present disclosure may have the following configurations. According to the technology related to the present disclosure having the following configurations, the light-emitting device makes it possible to reduce the parasitic capacitance generated at the electrode or the wiring line. Accordingly, the light-emitting device makes it possible to reduce the CR time constant, therefore improving the high-frequency characteristic such as the modulation speed. Effects exerted by the technology related to the present disclosure are not necessarily limited to the effects described above, and may be any of the effects described in the present disclosure.

(1)

A light-emitting device including:

a light emission section including a stack structure including an active layer, a first reflector, and a second reflector, the active layer performing light emission by current injection, the first reflector and the second reflector being stacked in a first direction with the active layer interposed therebetween;

a separation groove provided symmetrically around the light emission section on an emission surface of light from the stack structure in the first direction, the separation groove being dug in the stack structure in the first direction; and a high resistance region provided in the stack structure on outer side of an outermost shape of the separation groove on the emission surface, the high resistance region having electrical resistance higher than that of the light emission section.

(2)

The light-emitting device according to (1) described above, in which an electrode and a wiring line are provided in the high resistance region, the electrode injecting a current into the active layer, the wiring line being electrically coupled to the electrode.

(3)

The light-emitting device according to (1) or (2) described above, in which a current confinement layer is further provided between the emission surface and the active layer, the current confinement layer surrounding an unoxidized region by an annular oxidized region in an in-plane direction perpendicular to the first direction.

(4)

The light-emitting device according to (3) described above, in which the oxidized region continuously surrounds around the unoxidized region.

(5)

The light-emitting device according to any one of (1) to (4) described above, in which a depth to which the separation groove is dug from the emission surface is deeper than a depth at which the active layer is provided.

(6)

The light-emitting device according to any one of (1) to (5) described above, in which the separation groove includes an annular groove surrounding the light emission section.

(7)

The light-emitting device according to any one of (1) to (5) described above, in which the separation groove includes two or more grooves that are arranged symmetrically around the light emission section and separated away from each other.

(8)

The light-emitting device according to any one of (1) to (7) described above, in which the high resistance region is provided to expand deeper than a depth at which the active layer is provided in the first direction from the emission surface.

(9)

The light-emitting device according to any one of (1) to (8) described above, in which the stack structure in the high resistance region includes an impurity element.

(10)

The light-emitting device according to (9) described above, in which the impurity element includes one or more of H, C, B, O, Ar, Al, Ga, and As.

(11)

The light-emitting device according to (10) described above, in which a content of the impurity element is $5\times10^{13}/cm^2$ or more.

(12)

The light-emitting device according to (10) or (11) described above, in which the impurity element includes H.

(13)

The light-emitting device according to (12) described above, in which a content of the impurity element is $5\times10^{14}/cm^2$ or more.

(14)

The light-emitting device according to any one of (9) to (13) described above, in which a content of the impurity element has a distribution in the first direction.

(15)

The light-emitting device according to (14) described above, in which the distribution of the content of the impurity element has a peak at a depth at which the active layer is provided in the first direction.

(16)

The light-emitting device according to (14) described above, in which a current confinement layer is further provided between the emission surface and the active layer, the current confinement layer surrounding an unoxidized region by an annular oxidized region in an in-plane direction of the emission surface, and the distribution of the content of the impurity element has a peak at a depth at which the current confinement layer is provided in the first direction.

(17)

The light-emitting device according to any one of (1) to (16) described above, in which the first reflector and the second reflector are each provided with use of a multilayer-film reflection mirror.

(18)

The light-emitting device according to any one of (1) to (17) described above, in which the active layer includes a GaAs-based semiconductor.

This application claims the priority on the basis of Japanese Patent Application No. 2019-207371 filed on Nov. 15, 2019 with Japan Patent Office, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A light-emitting device, comprising:
a light emission section including a stack structure, wherein
the stack structure includes:
an active layer,
a first reflector, and
a second reflector,
the active layer is configured to perform performing light emission by current injection, and
the active layer is between the first reflector and the second reflector in a specific direction;
a separation groove symmetrically around the light emission section,
wherein the separation groove extends from a light emission surface of the stack structure in the specific direction; and
a high resistance region in the stack structure, wherein
the high resistance region is on an outer side of the separation groove,
the high resistance region has an electrical resistance higher than that of the light emission section,
the high resistance region includes an impurity element,
a content of the impurity element has a concentration distribution in the specific direction, and
the concentration distribution of the content has a peak at a first depth, in the specific direction, at which the active layer is in the light-emitting device.

2. The light-emitting device according to claim 1, further comprising an electrode and a wiring line in the high resistance region, wherein
the electrode is configured to inject a current into the active layer, and
the wiring line is electrically coupled to the electrode.

3. The light-emitting device according to claim 1, further comprising a current confinement layer between the light emission surface and the active layer,
wherein the current confinement layer includes:
an unoxidized region, and
an annular oxidized region that surrounds the unoxidized region in an in-plane direction perpendicular to the specific direction.

4. The light-emitting device according to claim 3, wherein the annular oxidized region continuously surrounds the unoxidized region.

5. The light-emitting device according to claim 1, wherein
the separation groove extends from the light emission surface to a second depth in the specific direction, and
the second depth is deeper than the first depth.

6. The light-emitting device according to claim 1, wherein the separation groove includes an annular groove surrounding the light emission section.

7. The light-emitting device according to claim 1, wherein
the separation groove includes at least two grooves symmetrically around the light emission section, and
a first groove of the at least two grooves is separate from a second groove of the at least two grooves.

8. The light-emitting device according to claim 1, wherein
the high resistance region extends from the light emission surface to a second depth in the specific direction, and
the second depth is deeper than the first depth.

9. The light-emitting device according to claim 1, wherein the impurity element includes at least one or more of H, C, B, O, Ar, Al, Ga, or As.

10. The light-emitting device according to claim 9, wherein the content of the impurity element is $5\times10^{13}/cm^2$ or more.

11. The light-emitting device according to claim 9, wherein the impurity element comprises H.

12. The light-emitting device according to claim 11, wherein the content of the impurity element is $5\times10^{14}/cm^2$ or more.

13. The light-emitting device according to claim 1, wherein each of the first reflector and the second reflector includes a multilayer-film reflection mirror.

14. The light-emitting device according to claim 1, wherein the active layer includes a GaAs-based semiconductor.

15. A light-emitting device, comprising:
a light emission section including a stack structure, wherein
the stack structure includes:
an active layer,
a first reflector, and
a second reflector,
the active layer is configured to perform light emission by current injection, and
the active layer is between the first reflector and the second reflector in a specific direction;
a separation groove symmetrically around the light emission section,
wherein the separation groove extends from a light emission surface of the stack structure in the specific direction;
a current confinement layer between the light emission surface and the active layer,
wherein the current confinement layer includes:
an unoxidized region, and
an annular oxidized region that surrounds the unoxidized region in
an in-plane direction perpendicular to the specific direction; and
a high resistance region in the stack structure, wherein
the high resistance region is on an outer side of the separation groove,
the high resistance region has an electrical resistance higher than that of the light emission section,
the high resistance region includes an impurity element,
a content of the impurity element has a concentration distribution in the specific direction, and
the concentration distribution of the content of the impurity element has a peak at a depth, in the specific direction, at which the current confinement layer is in the light-emitting device.

* * * * *